US010384878B2

(12) United States Patent
Kageyama et al.

(10) Patent No.: US 10,384,878 B2
(45) Date of Patent: Aug. 20, 2019

(54) DISPERSION AND SUPPLY DEVICE AND COMBINATION WEIGHING DEVICE

(71) Applicant: Ishida Co., Ltd., Kyoto (JP)

(72) Inventors: Toshiharu Kageyama, Ritto (JP); Yuji Okamoto, Ritto (JP); Michihiko Yonetsu, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 168 days.

(21) Appl. No.: 15/511,785

(22) PCT Filed: Sep. 18, 2015

(86) PCT No.: PCT/JP2015/076774
§ 371 (c)(1),
(2) Date: Mar. 16, 2017

(87) PCT Pub. No.: WO2016/043324
PCT Pub. Date: Mar. 24, 2016

(65) Prior Publication Data
US 2017/0305679 A1    Oct. 26, 2017

(30) Foreign Application Priority Data

Sep. 19, 2014 (JP) ................... 2014-191745
Jun. 16, 2015 (JP) ................... 2015-121006

(51) Int. Cl.
*B65G 27/32* (2006.01)
*B65G 65/44* (2006.01)
(Continued)

(52) U.S. Cl.
CPC ............ *B65G 27/32* (2013.01); *B65G 65/40* (2013.01); *B65G 65/44* (2013.01); *G01G 11/003* (2013.01); *G01G 19/387* (2013.01)

(58) Field of Classification Search
CPC .... G01G 11/003; G01G 19/387; B65G 27/32; B65G 65/40; B65G 65/44
See application file for complete search history.

(56) References Cited

U.S. PATENT DOCUMENTS 4,615,403 A    10/1986 Nakamura
5,054,652 A    10/1991 Oshima et al.
(Continued)

FOREIGN PATENT DOCUMENTS

JP    H2-136717 A    5/1990
JP    H5-180686 A    7/1993
(Continued)

OTHER PUBLICATIONS

Machine translation of JP-11014439 downloaded Dec. 19, 2018.*
(Continued)

*Primary Examiner* — Natalie Huls
(74) *Attorney, Agent, or Firm* — Studebaker & Brackett PC

(57) ABSTRACT

Provided is a dispersion and supply apparatus and a combination weighing apparatus capable of uniformly supplying articles to a plurality of positions from a dispersion table. A dispersion and supply apparatus 20 includes an acquisition unit 64 that acquires a load amount of an article on a dispersion table 22, a calculation unit 104 that calculates a deviation in a loading state of the article based on the load amount acquired by the acquisition unit 64, and a control unit 106 that controls a driving unit 30 such that a conveying direction of the article on the dispersion table 22 is changed based on the deviation in the loading state of the article calculated by the calculation unit 104.

5 Claims, 12 Drawing Sheets

(51) Int. Cl.
   *G01G 11/00* (2006.01)
   *G01G 19/387* (2006.01)
   *B65G 65/40* (2006.01)

(56) References Cited

U.S. PATENT DOCUMENTS

| | | | |
|---|---|---|---|
| 5,753,866 A | | 5/1998 | Ikeda et al. |
| 5,765,335 A | | 6/1998 | Simionato |
| 5,804,772 A | * | 9/1998 | Wooldridge ........... G01G 19/42 177/105 |

FOREIGN PATENT DOCUMENTS

| | | | |
|---|---|---|---|
| JP | H06-043012 A | | 2/1994 |
| JP | H6-065342 U | | 9/1994 |
| JP | 11014439 A | * | 1/1999 |
| JP | 3305816 B2 | | 7/2002 |
| JP | 2003-327326 A | | 11/2003 |
| WO | 2009/078273 | | 6/2009 |

OTHER PUBLICATIONS

Extended European Search Report issued by the European Patent Office dated May 9, 2018, which corresponds to EP15842435.8-1001 and is related to U.S. Appl. No. 15/511,785.

Notification of Transmittal of Translation of the International Preliminary Report on Patentability and Translation of Written Opinion of the International Searching Authority; PCT/JP2015/076774 dated Mar. 30, 2017.

International Search Report issued in PCT/JP2015/076774; dated Dec. 22, 2015.

An Office Action issued by the Chinese Patent Office dated Apr. 18, 2019, which corresponds to Chinese Patent Application No. 201580049846.7 and is related to U.S. Appl. No. 15/511,785; with English translation.

An Office Action, "Notice of Reasons for Refusal", issued by the Japanese Patent Office on Jul. 2, 2019, which corresponds to Japanese Patent Application No. 2016-548973 and is related to U.S. Appl. No. 15/551,785; with English translation.

* cited by examiner

DISPERSION AND SUPPLY DEVICE AND COMBINATION WEIGHING DEVICE

TECHNICAL FIELD

The present invention relates to a dispersion and supply apparatus and a combination weighing apparatus.

BACKGROUND ART

For example, an apparatus described in Patent Literature 1 has been known as a conventional dispersion and supply apparatus. The dispersion and supply apparatus described in Patent Literature 1 includes a dispersion feeder for receiving an article supplied from above using a dispersion table and conveying the article to each conveying means in a outer circumferential portion using vibration, dispersion detecting means for detecting a dispersion state of the article on the dispersion table, and tilting means for tilting the dispersion table such that a portion of an article receiving plate at which an article distribution is small tilts toward an article conveying means side approaching the portion depending on a detection result by the dispersion detecting means.

CITATION LIST

Patent Literature

Patent Literature 1: Japanese Unexamined Patent Publication No. 2003-327326

SUMMARY OF INVENTION

Technical Problem

In the above-described dispersion and supply apparatus, the portion at which the article distribution is small on the dispersion table is steeply tilted. Conversely, a portion of the dispersion table at which the article distribution is large is gradually tilted. Thus, a substantially uniform conveyance amount may be obtained from the portion.

However, in the conventional dispersion and supply apparatus, the dispersion table is tilted downward, and a portion at which the conveyance amount is large is further tilted. For this reason, in the conventional dispersion and supply apparatus, the conveyance amount temporarily increases when a slope is steep, and the article on the dispersion table is removed when the dispersion table is tilted. In this way, when a subsequently conveyed article is not supplied, a state in which the article distribution is small continues, and uniform supply may not be implemented. In addition, a lot of articles may not be conveyed to all article conveying means at a position on an opposite side from a portion at which the dispersion table is tilted. For this reason, there is concern that the conveyance amount with respect to a portion at which the conveyance amount is small may further decrease when the dispersion table is tilted. Therefore, there is a problem that a continuously stable uniform conveyance amount may not be expected.

An object of the invention is to provide a dispersion and supply apparatus and a combination weighing apparatus capable of uniformly supplying articles to a plurality of positions from dispersion tables.

Solution to Problem

A dispersion and supply apparatus according to an aspect of the invention is a dispersion and supply apparatus including a dispersion table that receives an article supplied from above and conveys the article to a plurality of positions of an outer circumferential portion, and a driving unit that drives the dispersion table, in which the dispersion and supply apparatus further includes an acquisition unit that acquires a load amount of the article on the dispersion table, a calculation unit that calculates a deviation in a loading state of the article based on the load amount acquired by the acquisition unit, and a control unit that controls the driving unit such that a conveying direction of the article on the dispersion table is changed based on the deviation in the loading state of the article calculated by the calculation unit.

In this dispersion and supply apparatus, the control unit controls the driving unit such that the conveying direction of the article on the dispersion table is changed based on the deviation in the loading state of the article calculated by the calculation unit. In this way, in the dispersion and supply apparatus, for example, when a deviation is generated in the load amount of the article on the dispersion table, the driving unit may be controlled to change the conveying direction of the article on the dispersion table, thereby dispersing the article. In this way, an inclination angle of the dispersion table is not changed, and thus articles may be continuously, stably, and uniformly conveyed. As a result, in the dispersion and supply apparatus, articles may be uniformly supplied from the dispersion table to a plurality of portions.

In an embodiment, the control unit may set a plurality of regions on the dispersion table, and control the driving unit based on the regions and a deviation center position of the loading state of the article. In this way, the driving unit may be easily controlled by setting the regions on the dispersion table, and for example, setting control content for each of the regions.

In an embodiment, at least one of the plurality of regions may be a region in which the conveying direction is not changed by the driving unit. When the region is not present, control of the driving unit is switched using a boundary between two regions as a trigger. In this case, for example, there is a concern that an article may not reach up to an end portion of each region when changing of the conveying direction is repeated around the boundary. On the other hand, when the region in which the conveying direction is not changed is set, articles are continuously conveyed in one direction in the region. For this reason, articles may be favorably dispersed on the dispersion table.

A combination weighing apparatus according to the invention includes the above-described dispersion and supply apparatus, a plurality of weighing hoppers disposed by being arranged in a circumferential direction around the dispersion table to hold articles supplied from the dispersion table, a weighing unit that measures weights of the articles held by the plurality of respective weighing hoppers, and an operation unit that selects a combination of the articles such that a value obtained by combining weighed values of the articles in the respective weighing hoppers falls within an allowable range around a target value.

In this combination weighing apparatus, the above-described dispersion and supply apparatus is included. Therefore, articles are uniformly supplied from the dispersion table to the weighing hoppers. For this reason, supply of articles to the weighing hoppers is uniformized, and thus weighing may be efficiently performed.

A dispersion and supply apparatus according to an aspect of the invention is a dispersion and supply apparatus including a dispersion table that receives an article supplied from above and conveys the article to a plurality of positions of an outer circumferential portion, a driving unit that drives the dispersion table, and a control unit that controls an operation of the driving unit, in which the control unit changes a conveying direction of the article on the dispersion table by a fixed vibration pattern that temporally changes a plurality of parameters related to the conveying direction on the dispersion table.

A dispersion and supply apparatus according to an aspect of the invention is a dispersion and supply apparatus including a dispersion table that receives an article supplied from above and conveys the article to a plurality of positions of an outer circumferential portion, and a driving unit that drives the dispersion table, in which the dispersion and supply apparatus further includes an acquisition unit that acquires a load amount of the article on the dispersion table, a calculation unit that calculates a deviation in a loading state of the article based on the load amount acquired by the acquisition unit, and a control unit that controls the driving unit, and the control unit selectively switches between a first operation mode in which a conveying direction of the article on the dispersion table is changed based on the deviation in the loading state of the article calculated by the calculation unit and a second operation mode in which the conveying direction of the article on the dispersion table is changed by a fixed vibration pattern based on a deviation in a loading state of the article on the dispersion table or a supply state of the article from the dispersion table.

Advantageous Effects of Invention

According to the invention, it is possible to uniformly supply articles to a plurality of positions from dispersion tables.

DESCRIPTION OF EMBODIMENTS

Figure 1:
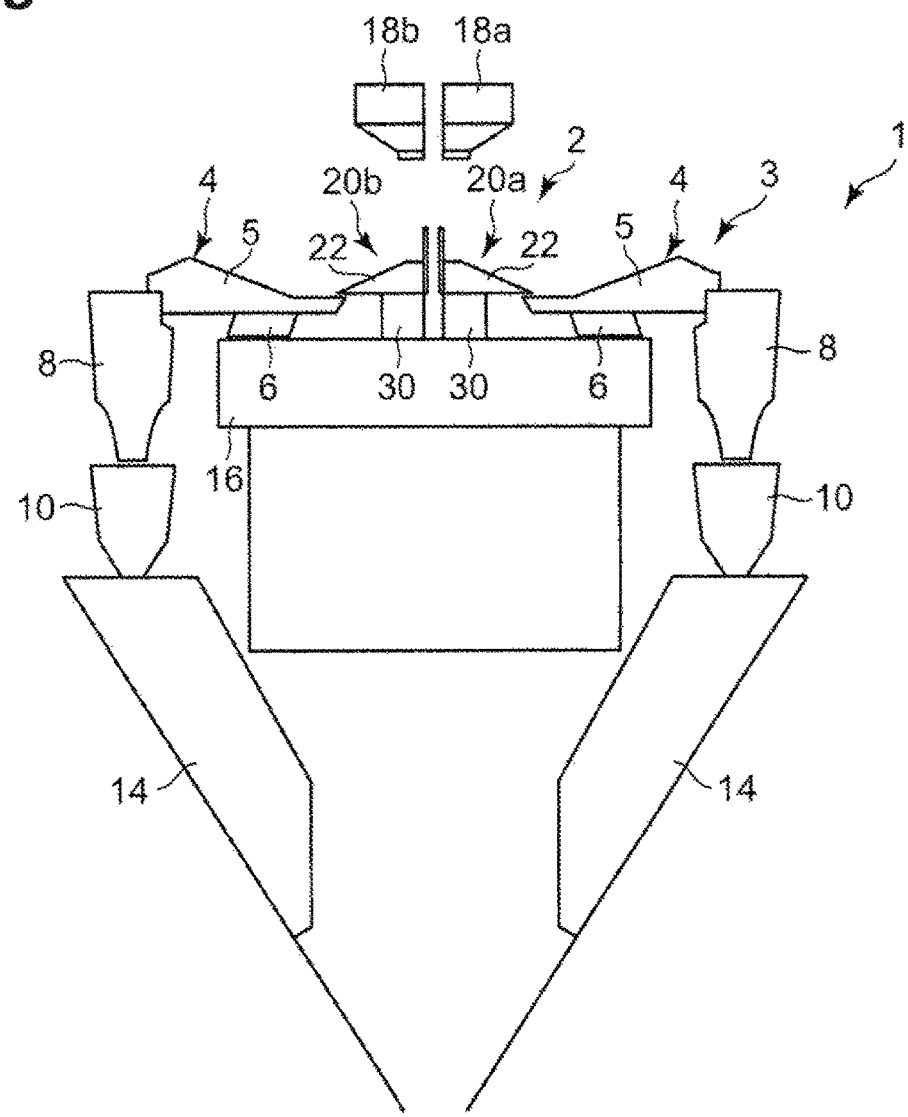
FIG. 1 is a schematic cross-sectional view illustrating a combination weighing apparatus including a dispersion and supply apparatus according to an embodiment.

Hereinafter, a preferred embodiment of the invention will be described in detail with reference to accompanying drawings. In description of the drawings, the same reference numeral will be assigned to the same or equivalent element, and a repeated description will be omitted.

Figure 2:
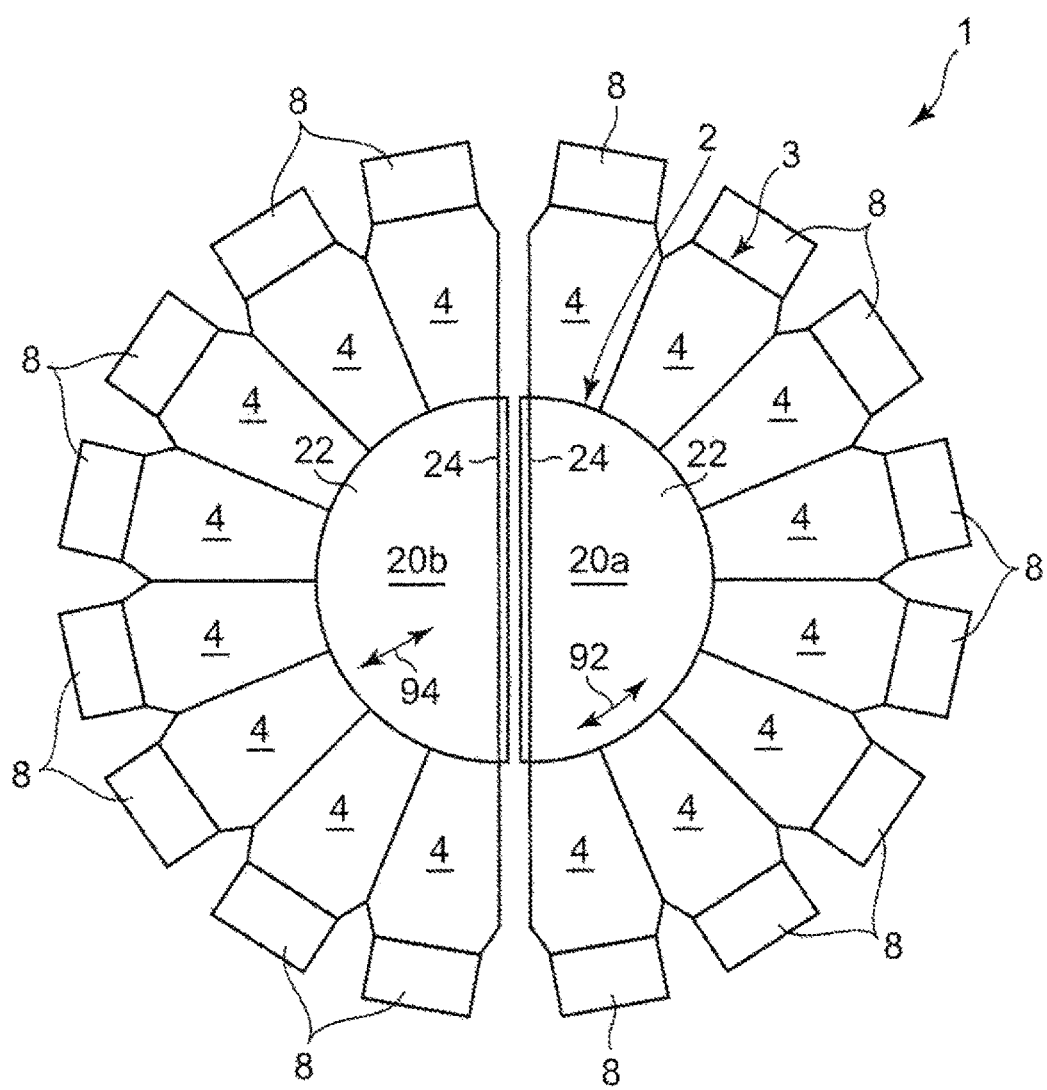
FIG. 2 is a schematic plan view illustrating the combination weighing apparatus illustrated in FIG. 1.
Figure 3:
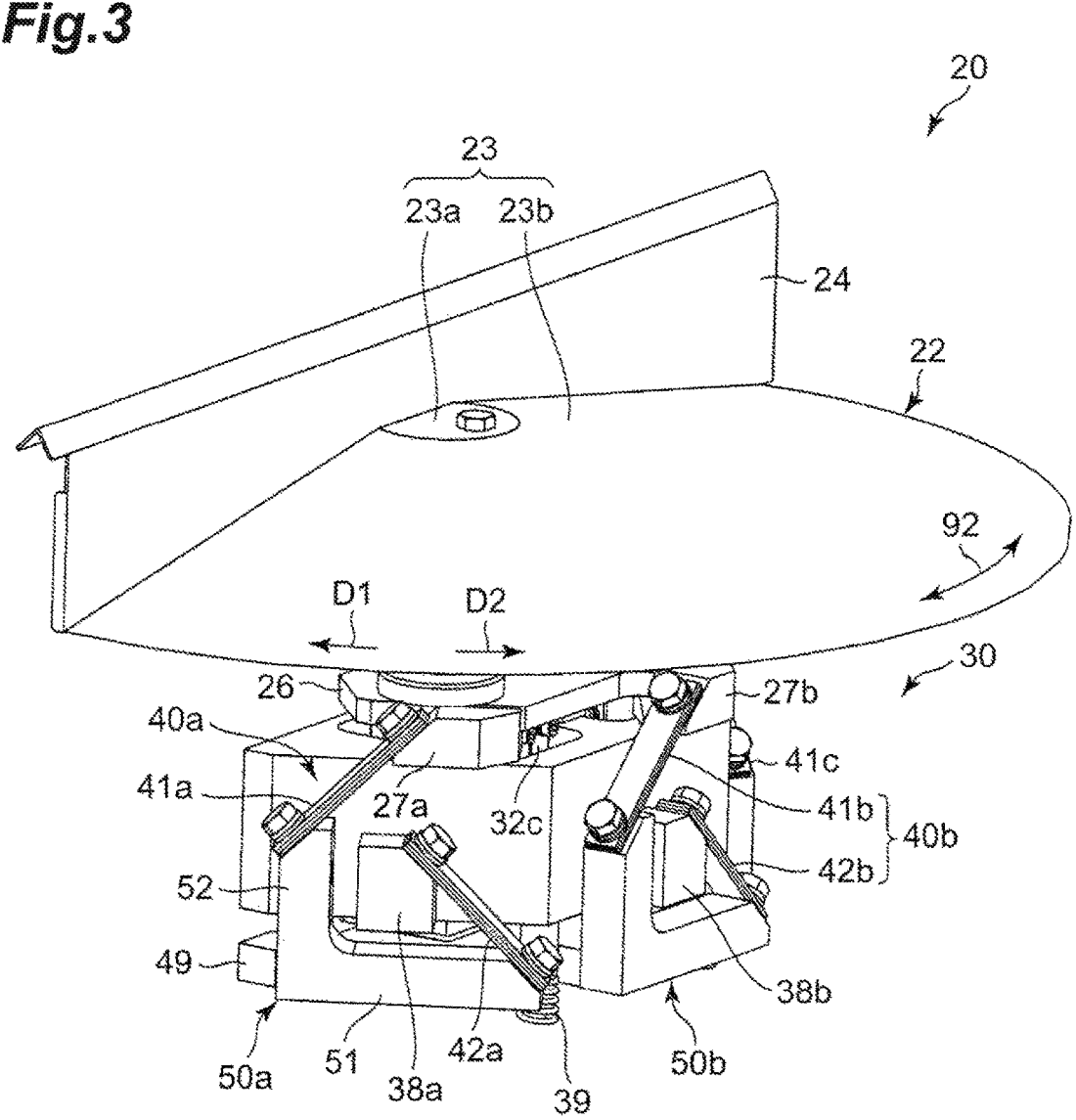
FIG. 3 is a perspective view illustrating the dispersion and supply apparatus.
Figure 4:
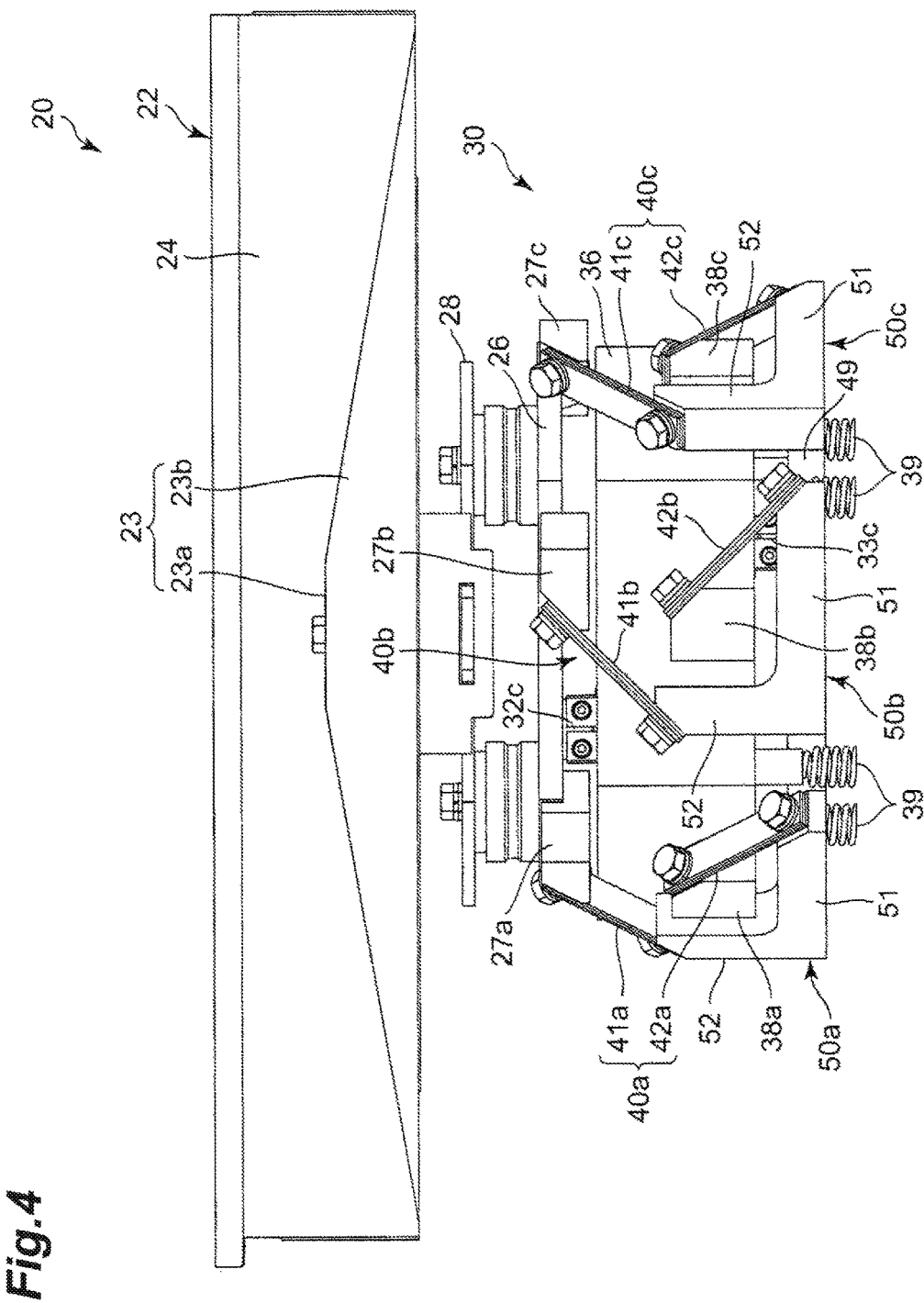
FIG. 4 is a side view of the dispersion and supply apparatus illustrated in FIG. 3.
Figure 5:
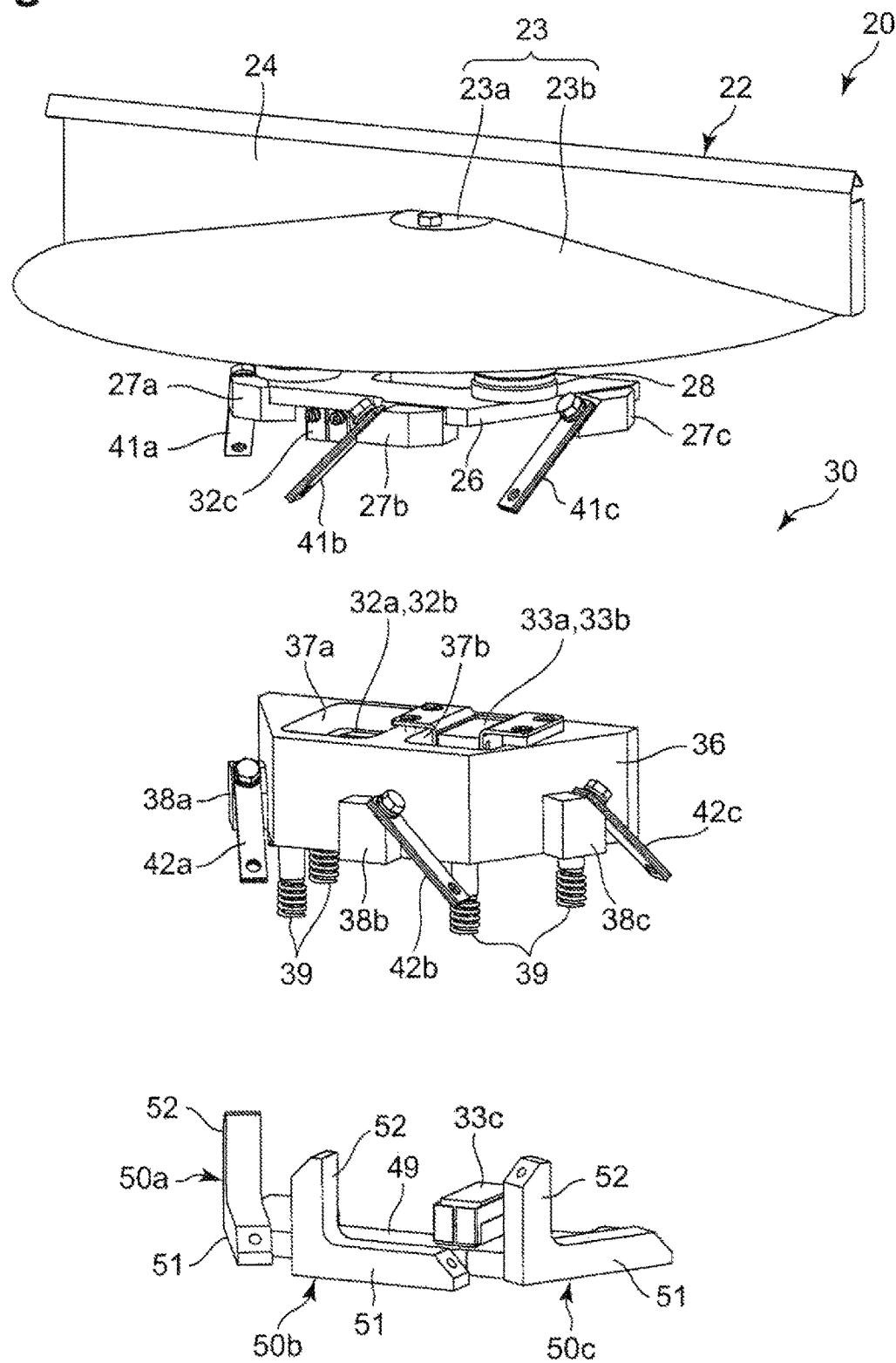
FIG. 5 is an exploded perspective view of the dispersion and supply apparatus illustrated in FIG. 3.
Figure 6:
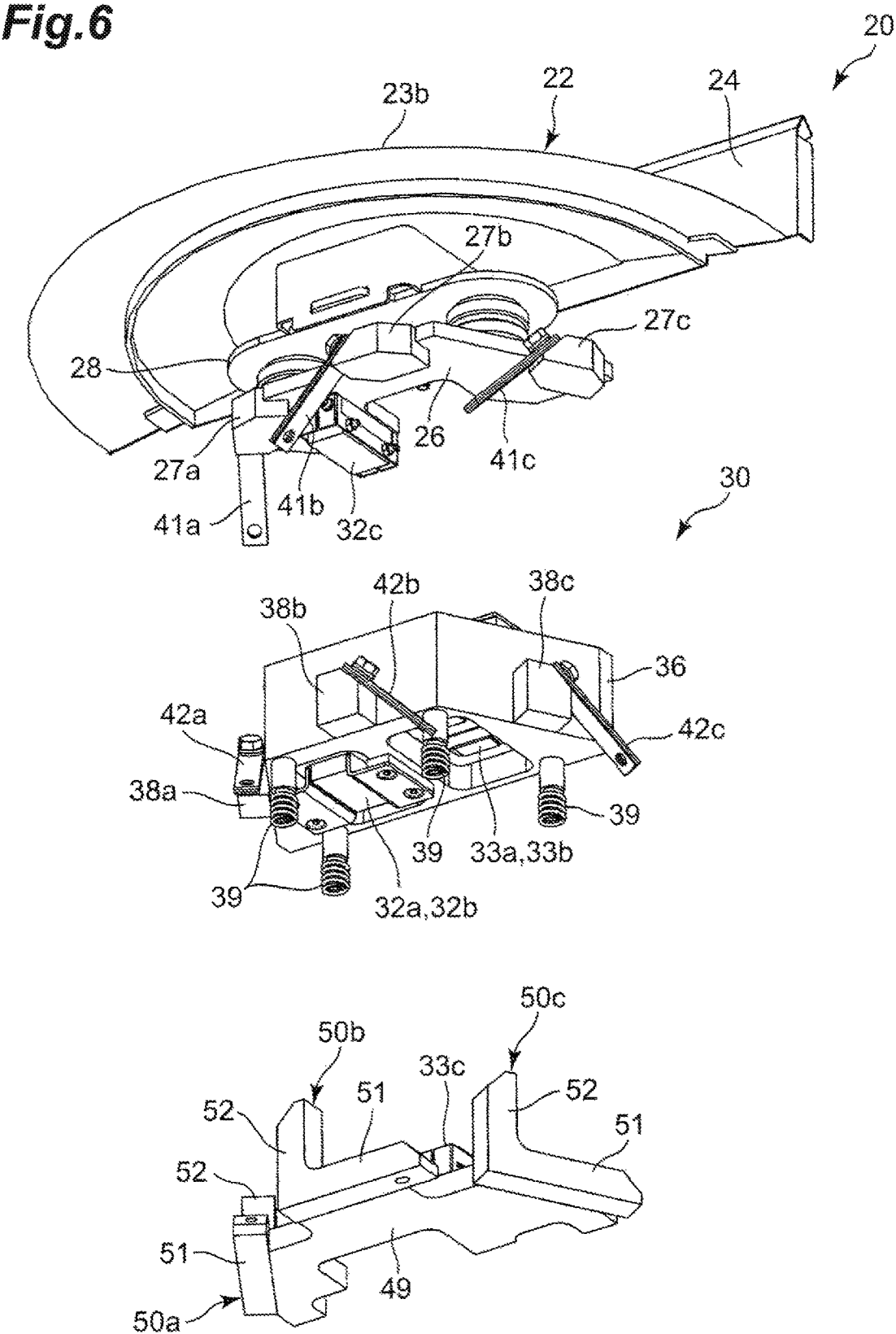
FIG. 6 is an exploded perspective view of the dispersion and supply apparatus viewed from a different direction from that in FIG. 5.

As illustrated in FIG. 1 and FIG. 2, a combination weighing apparatus 1 includes a dispersion supply portion 2 having a dispersion and supply apparatus 20 (described below), a conveyance portion 3 radially disposed with respect to the dispersion supply portion 2, a plurality of pool hoppers 8 disposed below an outer circumferential portion of the conveyance portion 3, a plurality of weighing hoppers 10 disposed below the pool hoppers 8, a collecting chute 14 disposed below the weighing hoppers 10, and a frame 16 that supports these components.

The dispersion supply portion 2 includes one or a plurality of dispersion and supply apparatus. In the present embodiment, the dispersion supply portion 2 is configured by combining two dispersion and supply apparatus 20 (20a and 20b). However, the dispersion supply portion 2 may be configured by combining three or more dispersion and supply apparatus. The dispersion supply portion 2 includes a plurality of dispersion tables 22 divided in a circumferential direction to have a conical shape as a whole. In addition, the dispersion supply portion 2 includes a vibrating mechanism (driving unit) 30 that applies a vibration to the dispersion table.

The conveyance portion 3 includes a plurality of radial feeders 4 arranged in a circumferential direction 92 (see FIG. 2) of the dispersion tables 22. A radial feeder 4 includes a trough 5 that radially extends from around a dispersion table 22, and a conveyance apparatus 6 that conveys an article on the trough 5 to a pool hopper 8. For example, the conveyance apparatus 6 is a vibrator that moves the article on the trough 5 by applying a vibration to the trough 5.

The pool hopper 8 and a weighing hopper 10 are provided for each of the radial feeders 4, and disposed below an outer end portion of the trough 5 of the corresponding radial feeder 4 in a radial direction 94 (see FIG. 2).

According to the combination weighing apparatus 1 configured as described above, it is possible to obtain an article (weighed article) having a weight close to a set weight by the following operation.

First, an article is supplied by falling onto the dispersion table 22 from a supply conveyor 18 (18a and 18b) disposed above the dispersion table 22. The article on the dispersion table 22 is conveyed outward in the radial direction by a slope of an upper surface of the dispersion table 22 while being dispersed in the circumferential direction due to vibration of the dispersion table 22 by the vibrating mechanism 30, and supplied by falling onto the trough 5 of the radial feeder 4.

An article on each trough 5 is conveyed outward in the radial direction 94 (see FIG. 2) by the radial feeder 4 and supplied by falling onto the pool hopper 8. Subsequently, the article is temporarily held on the pool hopper 8, and then supplied by falling onto the weighing hopper 10.

Figure 10:
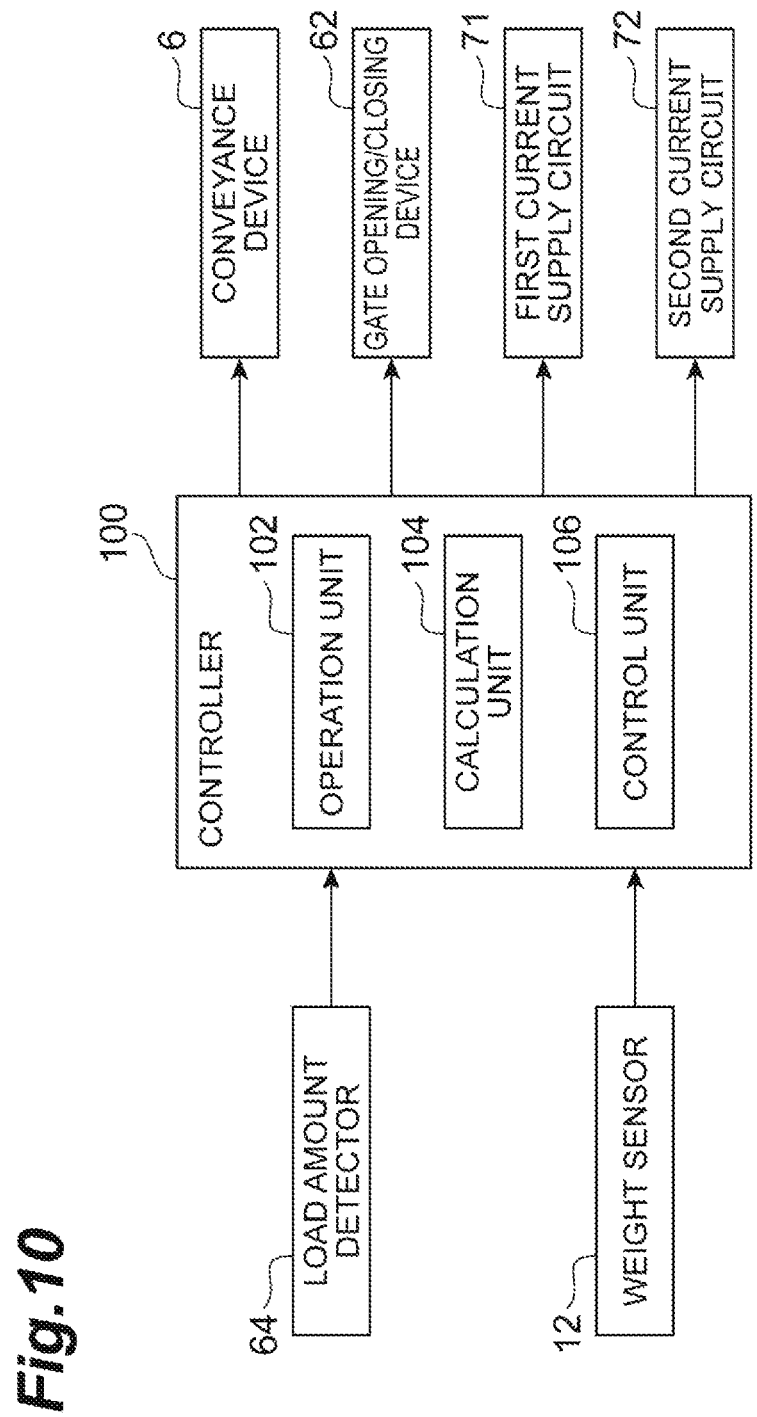
FIG. 10 is a block diagram illustrating a control system of the combination weighing apparatus.

Articles accommodated in the plurality of weighing hoppers 10 are weighed by weight sensors (weighing units) 12 (see FIG. 10). For example, a weight sensor 12 is a load cell provided for each of the weighing hoppers 10. Weighed values of the weight sensors 12 are combined by an operation unit 102 (see FIG. 10) of a controller 100 (described below), and a plurality of weighed value combinations is obtained. Further, a combination closest to the set weight is selected among the weighed value combinations by the operation unit 102, and gates (not illustrated) of a plurality of weighing hoppers 10 corresponding to the selected combination are opened. Articles inside the plurality of weighing hoppers 10, gates of which are opened, are supplied by falling onto the collecting chute 14. In this way, articles having weights close to the set weight are obtained.

[Dispersion and Supply Apparatus]

Hereinafter, a description will be given of a detailed configuration of the dispersion and supply apparatus.

As illustrated in FIG. 1 and FIG. 2, the two dispersion and supply apparatus 20 (20*a* and 20*b*) having the same configuration are mounted in the combination weighing apparatus 1. Each of the dispersion and supply apparatus 20*a* and 20*b* includes the dispersion table 22 and the vibrating mechanism 30. The dispersion table 22 has a semi-circular shape in a planar view. The two dispersion and supply apparatus 20*a* and 20*b* are disposed adjacent to each other such that the dispersion tables 22 thereof are combined in a substantially conical shape.

As illustrated in FIG. 1, the corresponding supply conveyors 18*a* and 18*b* are separately provided above the dispersion tables 22 of the respective dispersion and supply apparatus 20*a* and 20*b*. In this way, different types of articles may be supplied to the two dispersion tables 22 by falling onto the two dispersion tables 22. However, the same type of articles may be supplied to the two dispersion tables 22 from one supply conveyor 18. In any case, an article is supplied to each of the dispersion tables 22 from one position above the dispersion table 22. However, articles may be supplied to the dispersion table 22 from a plurality of positions above the dispersion table 22.

The vibrating mechanism 30 is provided for each of the dispersion tables 22. In this way, vibrating mechanisms 30 separately vibrate the two dispersion tables 22. However, a common vibrating mechanism 30 may be provided to the two dispersion tables 22 to apply a common vibration to the two dispersion tables 22.

The configuration of the dispersion and supply apparatus 20 will be described in more detail with reference to FIG. 3 to FIG. 8.

As illustrated in FIG. 3 to FIG. 6, the dispersion and supply apparatus 20 includes a single dispersion table 22. The dispersion table 22 includes a main table body 23 and a table base portion 26 that supports the main table body 23 through a connecting portion 28.

For example, the main table body 23 is configured by one plate-shaped member having a semi-conical shape. An upper surface of the main table body 23 includes a substantially semi-circular central portion 23*a* which is substantially horizontally disposed, and an inclined surface portion 23*b* spreading obliquely downward and outward in the radial direction from the central portion 23*a*. An outer circumferential portion of the inclined surface portion 23*b* has a circular arc shape in a planar view. The outer circumferential portion of the inclined surface portion 23*b* is disposed at substantially the same height across a whole length. For example, the central portion 23*a* and the inclined surface portion 23*b* have flat surfaces. However, the inclined surface portion 23*b* may be uneven as necessary. For example, a plurality of ribs extending in the radial direction may be provided to the inclined surface portion 23*b* such that an article on the inclined surface portion 23*b* is guided to each of the radial feeders 4 (see FIG. 1 and FIG. 2) by these ribs.

A partition portion 24 is fixed to the main table body 23. The partition portion 24 is disposed along a perpendicular direction. The partition portion 24 is disposed at both end portions of the main table body 23 in the circumferential direction 92.

The table base portion 26 is integrated with the main table body 23 through the connecting portion 28. When a vibration is applied to the table base portion 26, the main table body 23 vibrates integrally with the table base portion 26. Attaching portions 27*a*, 27*b*, and 27*c* to which one end portions of first elastic portions 41 (41*a*, 41*b*, and 41*c*) (described below) are attached are provided at a plurality of positions in an outer circumferential portion of the table base portion 26 in the circumferential direction 92. The plurality of attaching portions 27*a*, 27*b*, and 27*c* are disposed such that distances from the central portion 23*a* and heights thereof are equal to one another.

The vibrating mechanism 30 includes a plurality of elastic portion groups 40 (40*a*, 40*b*, and 40*c*) having the first elastic portions 41 (41*a*, 41*b*, and 41*c*) and second elastic portions 42 (42*a*, 42*b*, and 42*c*), a counter weight 36 connected to the dispersion table 22 through the elastic portion groups 40 (40*a*, 40*b*, and 40*c*), and a first vibration source 32 and a second vibration source 33 that vibrate the dispersion table 22 through the elastic portion groups 40 (40*a*, 40*b*, and 40*c*).

The counter weight 36 is disposed below the table base portion 26 of the dispersion table 22. Attaching portions 38*a*, 38*b*, and 38*c* to which one end portions of the second elastic portions 42 (42*a*, 42*b*, and 42*c*) are attached are provided at a plurality of positions in an outer circumferential portion of the counter weight 36 in the circumferential direction 92. A pair of through-holes 37*a* and 37*b* (see FIG. 5) extending in a vertical direction is provided in the counter weight 36.

The counter weight 36 is installed on the frame 16 (see FIG. 1) through a plurality of leg portions 39. The leg portions 39 extrude downward from the counter weight 36, and have extendable coil springs. The coil springs absorb a vibration of the counter weight 36. In this way, vibration transmission from the dispersion and supply apparatus 20*a* and 20*b* to the frame 16 is suppressed.

A connection base portion 49 is disposed below the counter weight 36. A plurality of connecting members 50*a*, 50*b*, and 50*c* provided for the respective elastic portion groups 40*a*, 40*b*, and 40*c* is fixed to a plurality of positions in an outer circumferential portion of the connection base portion 49 in the circumferential direction 92. In this way, the plurality of connecting members 50*a*, 50*b*, and 50*c* is integrated through the common connection base portion 49.

Each of the connecting members 50 (50*a*, 50*b*, and 50*c*) includes a substantially horizontally disposed horizontal portion 51 and a rising portion 52 rising from the horizontal portion 51. The horizontal portion 51 linearly extends along the circumferential direction 92. The rising portion 52 extends upward from one end portion of the horizontal portion 51.

In the present embodiment, a vibration source includes the first vibration source 32 and the second vibration source 33. The first vibration source 32 includes an electromagnetic coil 32*a* and a fixing iron core 32*b* attached to the counter weight 36, and a movable iron core 32*c* attached to the table base portion 26 of the dispersion table 22. The second vibration source 33 includes an electromagnetic coil 33*a* and a fixing iron core 33*b* attached to the counter weight 36, and a movable iron core 33*c* attached to the connection base portion 49. The electromagnetic coil 32*a* and the fixing iron core 32*b* of the first vibration source 32 are accommodated in one through-hole 37*a* (see FIG. 5) of the counter weight 36. The electromagnetic coil 33*a* and the fixing iron core 33*b* of the second vibration source 33 are accommodated in the other through-hole 37*b* (see FIG. 5) of the counter weight 36.

Figure 8:
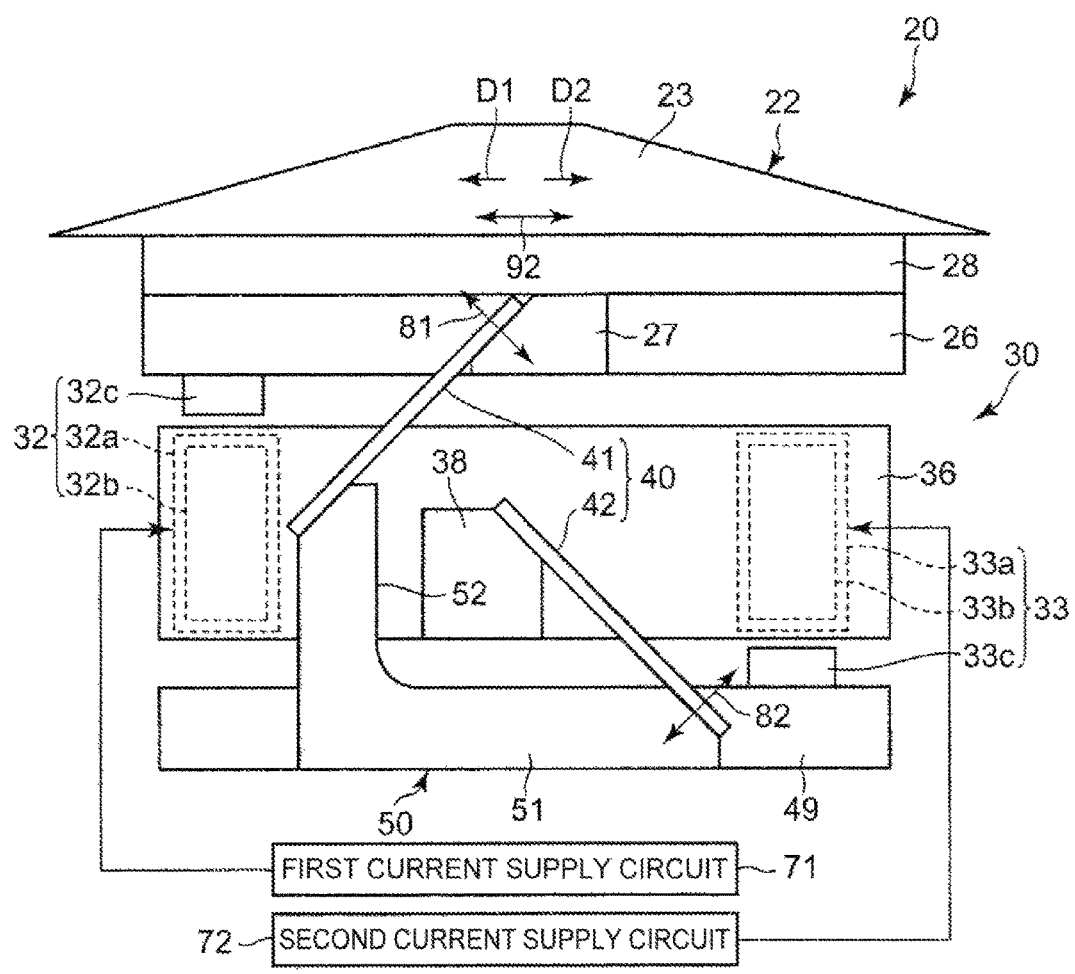
FIG. 8 is a schematic side view for description of a vibrating mechanism of the dispersion and supply apparatus illustrated in FIG. 3.

As illustrated in FIG. 8, a first current supply circuit 71 is electrically connected to the electromagnetic coil 32*a* of the first vibration source 32. A second current supply circuit 72

(see FIG. 8) is electrically connected to the electromagnetic coil 33a of the second vibration source 33. When an alternating current flows to the electromagnetic coils 32a and 33a, an oscillating field is generated, and the movable iron cores 32c and 33c vibrates in the vertical direction.

Figure 7:
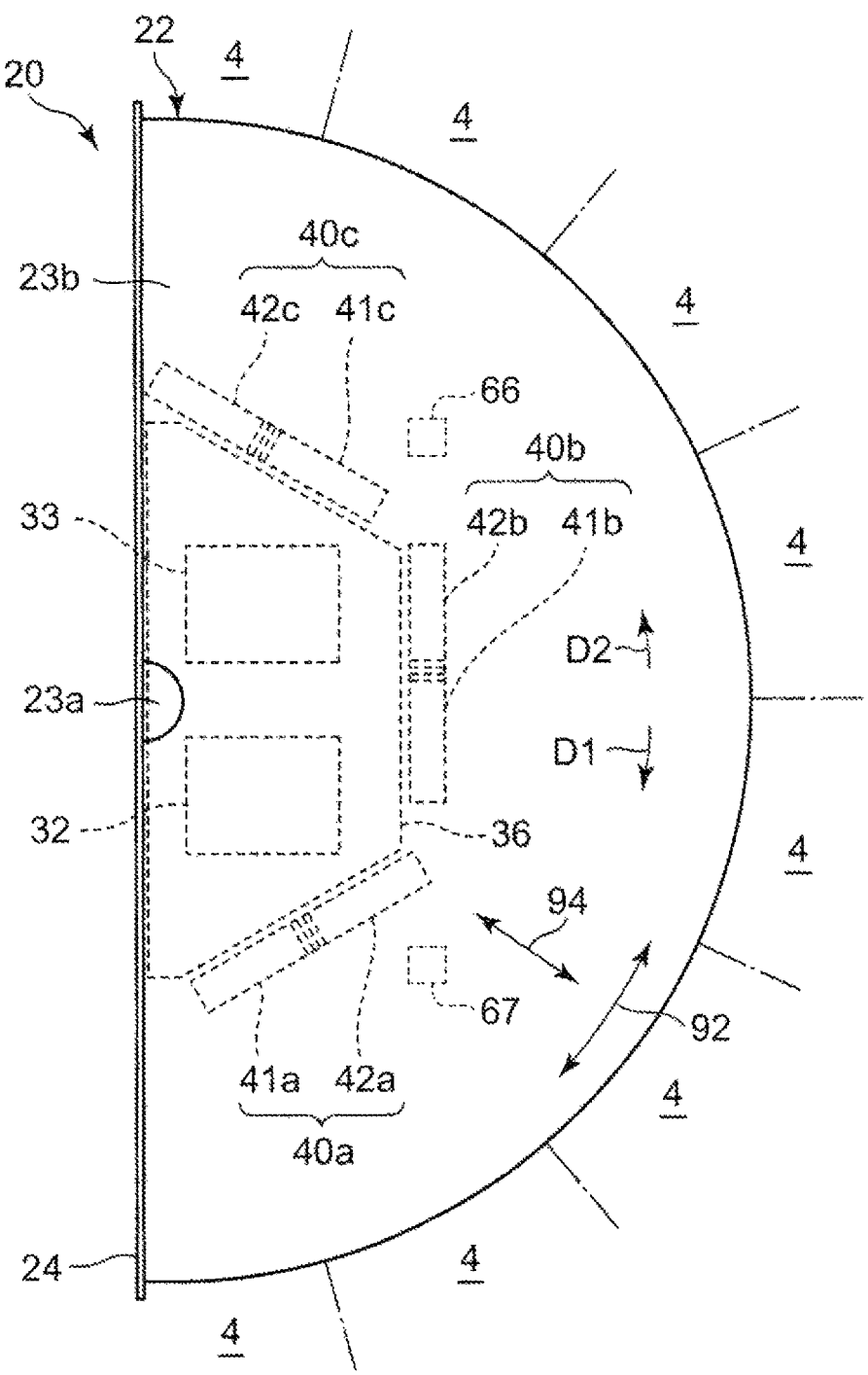
FIG. 7 is a plan view illustrating arrangement of main members of the dispersion and supply apparatus illustrated in FIG. 3.

As illustrated in FIG. 7, the plurality of elastic portion groups 40 (40a, 40b, and 40c) is disposed at different positions in the circumferential direction 92. In the present embodiment, three elastic portion groups 40a, 40b, and 40c are disposed at an angle interval of 60° in a planar view. However, the number of elastic portion groups is not restricted thereto.

The plurality of elastic portion groups 40a, 40b, and 40c are provided in parallel between the dispersion table 22 and the counter weight 36. In the respective elastic portion groups 40 (40a, 40b, and 40c), the first elastic portions 41 (41a, 41b, and 41c) and the second elastic portions 42 (42a, 42b, and 42c) are connected in series through the connecting members 50 (50a, 50b, and 50c).

A first elastic portion 41 and a second elastic portion 42 include an elongated member in which one end portion in a lengthwise direction easily vibrates in a bending direction using the other end portion as a fulcrum. Specifically, for example, the first elastic portion 41 and the second elastic portion 42 include a plurality of stacked flat springs. In this case, natural frequencies of the first elastic portions 41 and the second elastic portions 42 may be easily adjusted by changing the number of flat springs. The first elastic portion 41 has a first natural frequency f1. The second elastic portion 42 has a second natural frequency f2 which is different from the first natural frequency f1.

The first elastic portion 41 is disposed to be inclined with respect to the perpendicular direction. The second elastic portion 42 is disposed to be inclined in a different direction from a direction in which the first elastic portion 41 is inclined with respect to the perpendicular direction. Inclined directions of the first elastic portion 41 and the second elastic portion 42 are not restricted. However, for example, the first elastic portion 41 extends in a direction inclined by 45° downward toward one side in the circumferential direction 92. The second elastic portion 42 extends in a direction inclined by 45° downward toward the other side in the circumferential direction 92. A difference between an inclination angle of the first elastic portion 41 and an inclination angle of the second elastic portion 42 is 90° when viewed from the outside in the radial direction 94 (see FIG. 7). The difference in inclination angle when viewed from the outside in the radial direction is not restricted thereto. However, the difference is preferably 60° or more.

Upper end portions of the first elastic portions 41 are fixed to the attaching portions 27a, 27b, and 27c of the dispersion table 22, respectively. A lower end portion of the first elastic portion 41 extending obliquely downward toward the one side in the circumferential direction 92 from a portion connected to the dispersion table 22 is fixed to an upper end portion of the rising portion 52 of the connecting member 50. Upper end portions of the second elastic portions 42 are fixed to the attaching portions 38a, 38b, and 38c of the counter weight 36, respectively. A lower end portion of the second elastic portion 42 extending obliquely downward toward the other side in the circumferential direction 92 from a portion connected to the counter weight 36 is fixed to en end portion on an opposite side from the rising portion 52 in the horizontal portion 51 of the connecting member 50. In this way, the lower end portion of the first elastic portion 41 and the lower end portion of the second elastic portion 42 are compactly connected by the connecting member 50 in the vertical direction and the circumferential direction 92. In addition, the first elastic portion 41 and the second elastic portion 42 are disposed to overlap each other in the vertical direction and the circumferential direction 92, thereby further attempting compactness in these directions.

[Operation of Dispersion and Supply Apparatus]

An operation of the dispersion and supply apparatus 20 will be described with reference to FIG. 7 to FIG. 9.

FIG. 7 is a plan view illustrating arrangement of the dispersion table 22 of the dispersion and supply apparatus 20, the plurality of elastic portion group 40a, 40b, and 40c, etc. FIG. 7 illustrates main members, and other members are not illustrated. FIG. 8 is a schematic side view for description of the vibrating mechanism 30. FIG. 8 illustrates only one elastic portion group 40 and one connecting member 50 corresponding thereto to facilitate understanding. FIG. 9 is a graph illustrating an example of a relation between a vibration frequency of a vibration generated by the vibration sources 32 and 33 and amplitude of a combined vibration transferred to the dispersion table 22.

All the elastic portion group 40a, 40b, and 40c are connected to the dispersion table 22 and the counter weight 36 using the same connecting structure, and thus a common mechanism for delivering a vibration of the first elastic portions 41 and/or the second elastic portions 42 to the dispersion table 22 is used for all the elastic portion group 40a, 40b, and 40c.

The mechanism for delivering a vibration of the first elastic portions 41 and/or the second elastic portions 42 to the dispersion table 22 will be described with reference to FIG. 8 using the one elastic portion group 40 as an example.

The first elastic portion 41 and the second elastic portion 42 are connected in series. Therefore, only one of the first elastic portion 41 and the second elastic portion 42 is resonated to apply a vibration thereof to the dispersion table 22. Alternatively, both the first elastic portion 41 and the second elastic portion 42 may be resonated to apply a combined vibration thereof to the dispersion table 22.

The first elastic portion 41 is inclined upward toward one side in the circumferential direction 92 and connected to the dispersion table 22. The second elastic portion 42 is inclined downward toward the same side in the circumferential direction 92 and connected to the dispersion table 22 through the connecting member 50 and the first elastic portion 41.

When an alternating current is supplied to the first vibration source 32 from the first current supply circuit 71, a vertical vibration of the movable iron core 32c of the first vibration source 32 is delivered to the upper end portion of the first elastic portion 41 through the table base portion 26 of the dispersion table 22. When a vibration frequency of this vibration is the first natural frequency f1 or a vibration frequency close thereto, the first elastic portion 41 resonates. In this way, the upper end portion of the first elastic portion 41 shakes in an inclined direction 81 orthogonal to the lengthwise direction of the first elastic portion 41 using the lower end portion as a fulcrum, and this vibration in the inclined direction 81 is delivered to the dispersion table 22.

When an alternating current is supplied to the second vibration source 33 from the second current supply circuit 72, a vertical vibration of the movable iron core 33c of the second vibration source 33 is delivered to the lower end portion of the second elastic portion 42 through the connection base portion 49 and the connecting member 50. When a vibration frequency of this vibration is the second natural frequency f2 or a vibration frequency close thereto, the second elastic portion 42 resonates. In this way, the lower end portion of the second elastic portion 42 shakes in an inclined direction 82 orthogonal to the lengthwise direction of the second elastic portion 42 using the upper end portion as a fulcrum. This vibration in the inclined direction 82 is delivered to the dispersion table 22 through the connecting member 50 and the first elastic portion 41.

The second elastic portion 42 may resonate similarly to the above description by a vibration of the first vibration source 32. In more detail, when a vibration of the second natural frequency f2 or a vibration frequency close thereto is generated by the first vibration source 32, this vibration is delivered from the movable iron core 32c to the lower end portion of the second elastic portion 42 through the table base portion 26, the first elastic portion 41, and the connecting member 50, and the second elastic portion 42 resonates similarly to the above description.

When only the first elastic portion 41 resonates, a vibration in a direction inclined in the circumferential direction 92 with respect to the perpendicular direction at a position in a circumferential direction connected to the elastic portion group 40 is applied to the dispersion table 22. In this way, an article on the dispersion table 22 is thrown obliquely upward. As a result, the article on the dispersion table 22 is conveyed in a first direction D1 of the circumferential direction 92. Meanwhile, when only the second elastic portion 42 resonates, a vibration in a direction inclined to an opposite side in the circumferential direction 92 with respect to the perpendicular direction at a position in the circumferential direction connected to the elastic portion group 40 is applied to the dispersion table 22. In this way, an article on the dispersion table 22 is thrown obliquely upward to an opposite side when compared to a case in which only the first elastic portion 41 resonates. As a result, the article on the dispersion table 22 is conveyed in a second direction D2 opposite to the first direction D1 in the circumferential direction 92.

When both the first elastic portion 41 and the second elastic portion 42 resonate, a combined vibration delivered to the dispersion table 22 may be controlled in various modes by controlling a vibration frequency and a phase of a vibration generated by the vibration sources 32 and 33. In this way, for example, an article on the dispersion table 22 may be thrown upward, moved in a trajectory along an ellipse, or reciprocated in the circumferential direction 92 without being shifted in the circumferential direction 92.

A description will be given of an example of a preferred vibration frequency of a vibration generated by the vibration sources 32 and 33 with regard to a case in which the first natural frequency f1 and the second natural frequency f2 are sufficiently larger than a natural frequency f0 of the coil springs of the leg portions 39, and the first natural frequency f1 is larger than the second natural frequency f2 with reference to FIG. 9.

Figure 9:
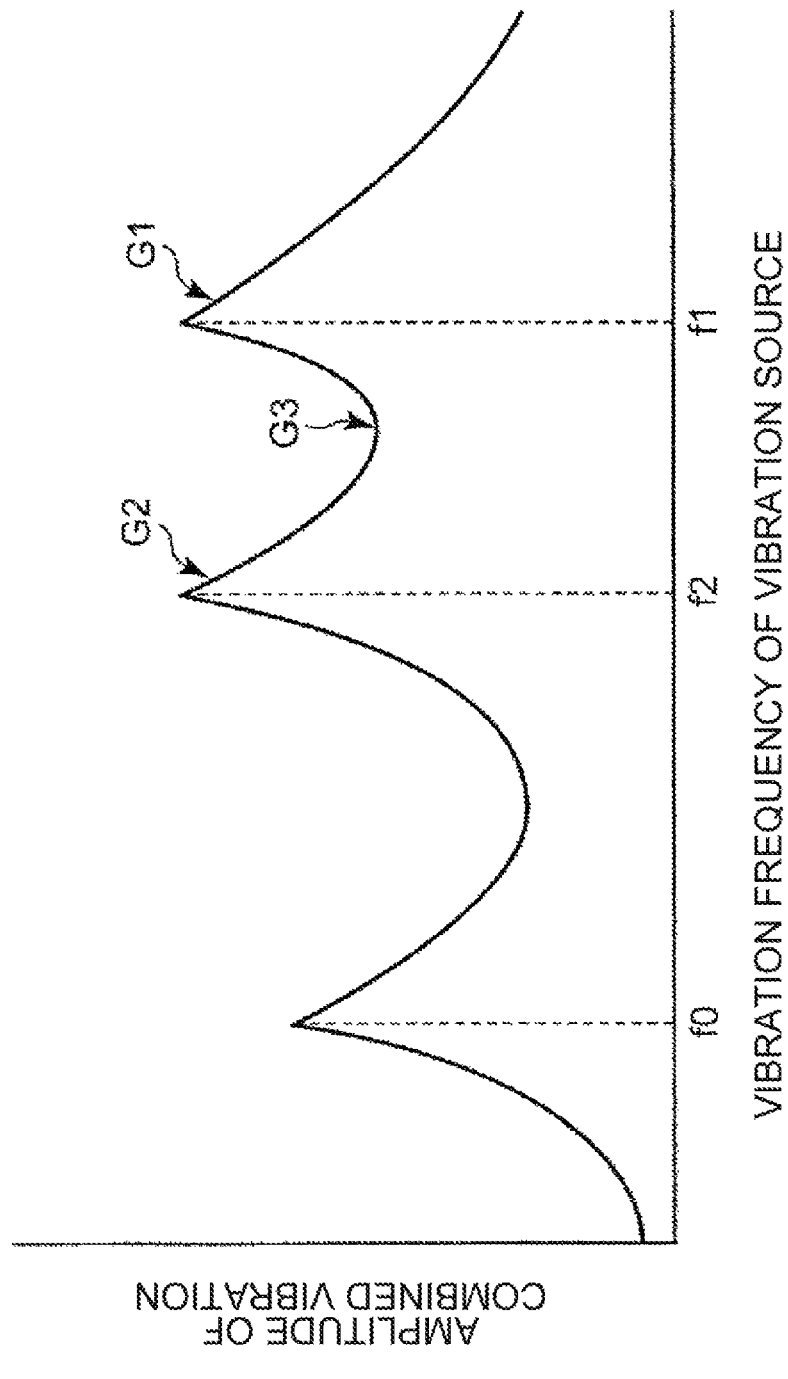
FIG. 9 is a graph illustrating an example of a relation between a vibration frequency of a vibration source and amplitude of a combined vibration.

As illustrated in FIG. 9, when a vibration of a vibration frequency equal to any one of the first natural frequency f1 or the second natural frequency f2 is generated, the first elastic portion 41 or the second elastic portion 42 resonates, and thus amplitude of a vibration delivered to the dispersion table 22 is at a peak. The amplitude of the vibration delivered to the dispersion table 22 rapidly decreases at a vibration frequency around the peak. However, a gradient indicating a drop in amplitude is prone to be gentle at a high vibration frequency side than at a low vibration frequency side of a peak. For this reason, a combined vibration having large amplitude may be obtained when a vibration frequency of a vibration generated by the vibration sources 32 and 33 is shifted to a high vibration frequency side from the peak when compared to a case in which the vibration frequency is shifted to a low vibration frequency side therefrom. Therefore, when the first elastic portion 41 is separately resonated, it is preferable to generate a vibration of a slightly larger vibration frequency than the first natural frequency f1 as indicated by a symbol G1 of FIG. 9 using the first vibration source 32 in consideration of an error in a vibration frequency. Similarly, when the second elastic portion 42 is separately resonated, it is preferable to generate a vibration of a slightly larger vibration frequency than the second natural frequency f2 as indicated by a symbol G2 of FIG. 9 using the second vibration source 33 or the first vibration source 32.

When both the first elastic portion 41 and the second elastic portion 42 are resonated at a common vibration frequency, a vibration may be generated by a vibration frequency between the first natural frequency f1 and the second natural frequency f2 as indicated by a symbol G3 of FIG. 9. In this case, only the first vibration source 32 may be driven, or both the first vibration source 32 and the second vibration source 33 may be driven at the same vibration frequency. In addition, in this case, amplitude of a vibration of the first elastic portion 41 may be increased by adjusting the vibration frequency of the vibration source to approach the first natural frequency f1, thereby increasing a delivery amount of articles in the first direction D1 (see FIG. 8) of the circumferential direction 92. Meanwhile, amplitude of a vibration of the second elastic portion 42 may be increased by adjusting the vibration frequency of the vibration source to approach the second natural frequency f2, thereby increasing a delivery amount of articles in the second direction D2 (see FIG. 8) of the circumferential direction 92. The first natural frequency f1 and the second natural frequency f2 may be set to values close to each other in advance in order to allow both the first elastic portion 41 and the second elastic portion 42 to resonate at the same vibration frequency. On the contrary, when one of the first elastic portion 41 or the second elastic portion 42 is separately resonated at all times, the first natural frequency f1 and the second natural frequency f2 may be set to values, a difference of which is sufficient (for example, 10 Hz or more), in advance.

[Control System]

A description will be given of a control system of the combination weighing apparatus 1 with reference to FIG. 10.

Various operations of the combination weighing apparatus 1 (the dispersion and supply apparatus 20) are controlled by the controller 100. The controller 100 includes a Central Processing Unit (CPU), a Read Only Memory (ROM), a Random Access Memory (RAM), etc. A load amount detector (acquisition unit) 64 and the weight sensor 12 are connected to the controller 100. In addition, the conveyance apparatus 6, a gate opening/closing apparatus 62, the first current supply circuit 71, and the second current supply circuit 72 are connected to the controller 100.

The load amount detector 64 acquires a load amount of an article on the dispersion table 22 of the dispersion and supply apparatus 20. As illustrated in FIG. 7, the load amount detector 64 is a multi-point cell-type weight sensor including a plurality of (herein, two) load cells 66 and 67 attached to a lower surface of the dispersion table 22. For example, the load cells 66 and 67 are disposed at positions facing each other on the same straight line. The number of load cells may be appropriately set depending on the design. The load amount detector 64 outputs a load amount signal indicating a detected load amount of an article to the controller 100. The weight sensor 12 outputs a weighing signal indicating a weighted value to the controller 100.

As illustrated in FIG. 10, the controller 100 includes the operation unit 102, a calculation unit 104, and a control unit 106. For example, a function in the controller 100 may be configured as software in which a program stored in the ROM is loaded in the RAM and executed in the CPU. The controller 100 may be configured as hardware including an electronic circuit, etc.

The operation unit 102 selects a combination of articles such that a value obtained by combining weighed values of articles in the weighing hoppers 10 corresponds to a set weight (within an allowed range) based on a target value. The operation unit 102 selects a combination closest to the set weight from weighed value combinations, and outputs a gate opening signal for opening gates of a plurality of weighing hoppers 10 corresponding to the selected combination to the control unit 106.

The calculation unit 104 calculates a deviation in a loading state of an article based on a load amount of the article acquired by the load amount detector 64. Upon receiving the load amount signal output from the load amount detector 64, the calculation unit 104 calculates a deviation center position (center of gravity) of the loading state of the article on the dispersion table 22 based on the load amount indicated by the load amount signal.

Specifically, when a distance between the load cell 66 and the load cell 67 is set to L, an output value output from the load cell 66 is set to W1, an output value output from the load cell 67 is set to W2, and the deviation center position is set to x, the calculation unit 104 calculates the deviation center position x using the following Equation.

$$W_1 \times \left(\frac{L}{2} - x\right) = W_2 \times \left(\frac{L}{2} + x\right) \qquad \text{[Equation 1]}$$
$$x = \frac{W_1 - W_2}{W_1 + W_2} \times \frac{L}{2}$$

The calculation unit 104 outputs a deviation center signal indicating the calculated deviation center position x of the loading state of the article to the control unit 106.

The control unit 106 controls respective operations of the conveyance apparatus 6 of the plurality of radial feeders 4, the gate opening/closing apparatus 62 of the plurality of weighing hoppers 10, and the first current supply circuit 71 and the second current supply circuit 72 of the dispersion and supply apparatus 20a and 20b. The control unit 106 outputs control signals to the conveyance apparatus 6, the gate opening/closing apparatus 62, the first current supply circuit 71, and the second current supply circuit 72 based on a calculation result calculated by the calculation unit 104, information stored in a storage (not illustrated), and/or various input signals. Upon receiving the gate opening signal output from the operation unit 102, the control unit 106 controls the gate opening/closing apparatus 62 depending on the gate opening signal.

The control unit 106 controls the vibrating mechanism 30, that is, the first current supply circuit 71 and the second current supply circuit 72 such that a conveying direction (the first direction D1 and the second direction D2) of an article on the dispersion table 22 is changed based on a deviation in a loading state of the article calculated by the calculation unit 104. Upon receiving the deviation center signal output from the calculation unit 104, the control unit 106 calculates control signals output to the first current supply circuit 71 and the second current supply circuit 72 based on the deviation center position of the loading state of the article indicated by the deviation center signal. When the control unit 106 outputs the control signals to the first current supply circuit 71 and the second current supply circuit 72, the first current supply circuit 71 and the second current supply circuit 72 are controlled, and driving of the first vibration source 32 and/or the second vibration source 33 is controlled. In this way, a mode of a vibration applied to the dispersion table 22 is controlled, and the conveying direction of the article on the dispersion table 22 is changed.

The control unit 106 normally outputs control signals to the first current supply circuit 71 and the second current supply circuit 72 such that a deviation is not generated in the loading state of the article on the dispersion table 22 and such that the dispersion table 22 is alternately driven N (N is an integer) times in the first direction D1 and N times in the second direction D2.

Figure 11:
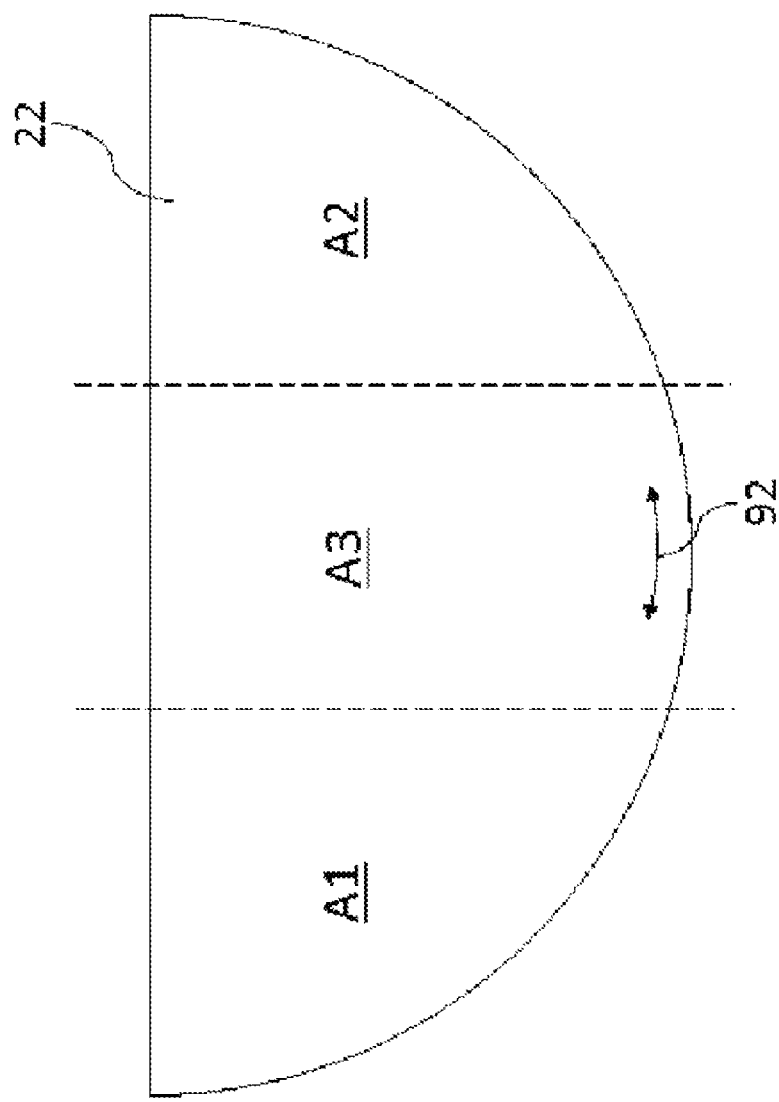
FIG. 11 is a diagram for description of regions set on a dispersion table by a control unit.

The control unit 106 sets a plurality of regions on the dispersion table 22, and controls the first current supply circuit 71 and the second current supply circuit 72 based on the regions and a deviation center position of the load amount of the article. As illustrated in FIG. 11, for example, the control unit 106 sets three regions A1, A2, and A3 on the dispersion table 22. The region A1 is set on one side (left side in the figure) in the circumferential direction 92 on the dispersion table 22. The region A2 is set on the other side (right side in the figure) in the circumferential direction 92 on the dispersion table 22. The region A3 is set between the region A1 and the region A2 on the dispersion table 22. The regions set on the dispersion table 22 are set restricted to the above-described three regions A1, A2, and A3.

The control unit 106 controls the first current supply circuit 71 and the second current supply circuit 72 depending on the regions A1, A2, and A3 in which the deviation center position P of the load amount of the article is present. When the deviation center position P is present in the region A1 as illustrated in FIG. 12(b), the control unit 106 outputs control signals to the first current supply circuit 71 and the second current supply circuit 72 such that the article is conveyed in the second direction D2 (to the region B side) as illustrated in FIG. 12(a). In addition, when the deviation center position P is present in the region A2 as illustrated in FIG. 12(d), the control unit 106 outputs control signals to the first current supply circuit 71 and the second current supply circuit 72 such that the article is conveyed in the first direction D1 (to the region A side) as illustrated in FIG. 12(a). When the deviation center position P is present in the region A3 as illustrated in FIG. 12(c), the control unit 106 outputs control signals to the first current supply circuit 71 and the second current supply circuit 72 such that a current conveying direction is maintained as illustrated in FIG. 12(a). That is, the region A3 is set as a region in which the conveying direction of the article is not changed. As illustrated in FIG. 12(a), the control unit 106 controls the first current supply circuit 71 and the second current supply circuit 72 using threshold values Th1 and Th2 (a boundary between the region A1 and the region A3 and a boundary between the region A2 and the region A3) as control switching points (control switching triggers).

When control signals are output from the control unit 106 to the first current supply circuit 71 and the second current supply circuit 72, amplitude and a phase of a vibration of the first elastic portion 41 or the second elastic portion 42 is adjusted by control of vibration frequencies and/or phases of the vibration sources 32 and 33. In this way, the conveying direction of the article may be changed on the dispersion table 22.

As described in the foregoing, the controller 100 of the combination weighing apparatus 1 according to the present embodiment includes the control unit 106. The control unit 106 calculates a deviation in the loading state of the article calculated based on a detection result by the load amount detector 64, and controls the vibrating mechanism 30 based on the deviation. In this way, in the dispersion and supply apparatus 20, when a deviation is generated in the load amount of the article on the dispersion table 22, the vibrating mechanism 30 may be controlled to change the conveying direction of the article on the dispersion table 22, thereby dispersing the article. In this way, an inclination angle of the dispersion table 22 is not changed, and thus articles may be continuously, stably, and uniformly conveyed. As a result, in the dispersion and supply apparatus 20, articles may be uniformly supplied from the dispersion table 22 to a plurality of conveyance portions 3.

Figure 12:
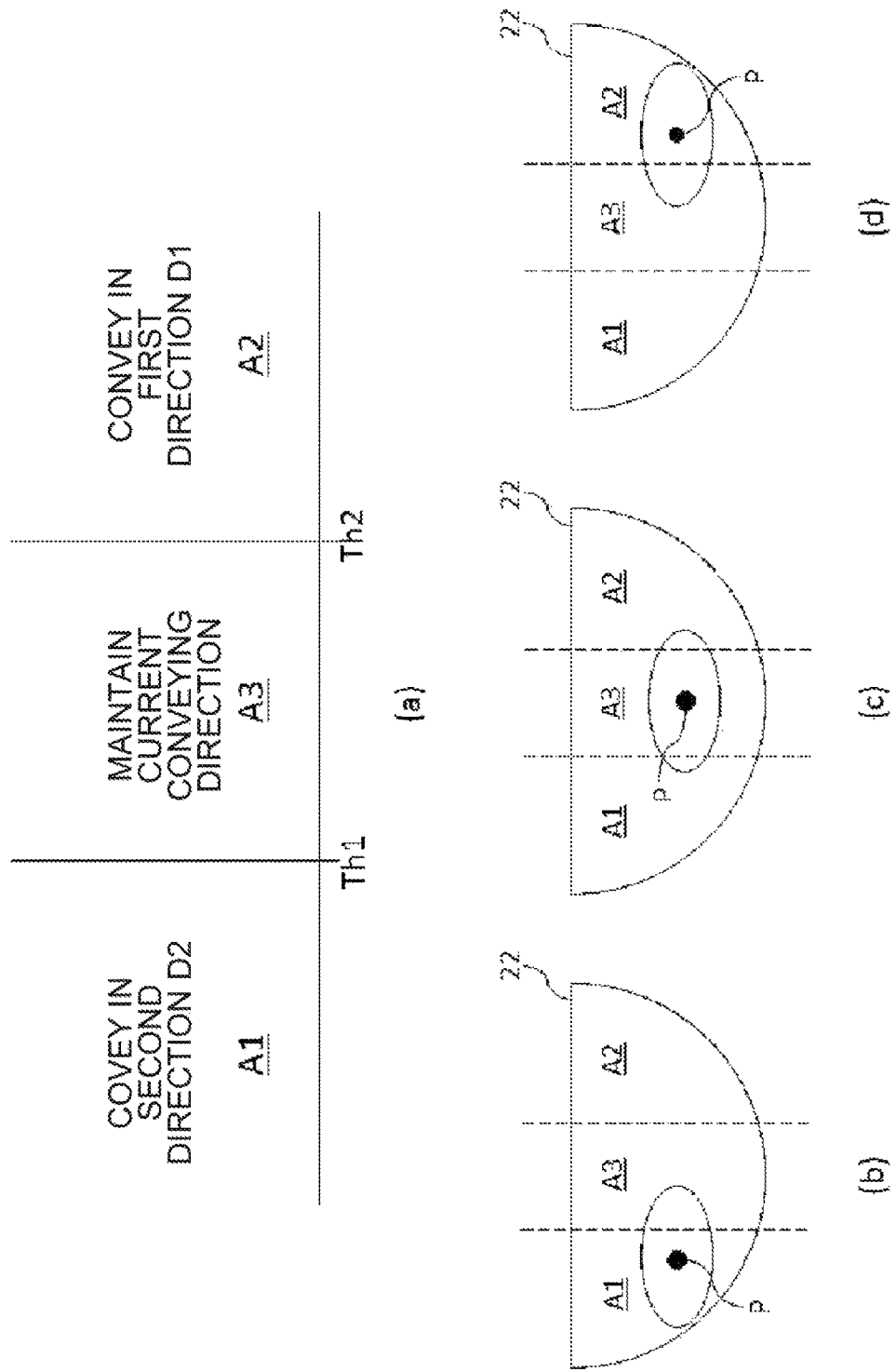
FIG. 12 is a diagram for description of control depending on the regions set on the dispersion table.

In the present embodiment, the control unit 106 sets a plurality of regions on the dispersion table 22, and controls the vibrating mechanism 30 based on the regions and the deviation center position P of the load amount of the article. In this way, for example, as illustrated in FIG. 12, the vibrating mechanism 30 may be easily controlled by setting the regions A1, A2, and A3 on the dispersion table 22, and setting control content for each of the regions A1, A2, and A3.

In the present embodiment, the region A3 is a region in which the conveying direction is not changed by the driving unit. When the region A3 is not present, control of the vibrating mechanism 30 is switched using a boundary between two regions A1 and A2 (threshold values Th1 and Th2) as a trigger. In this case, for example, there is a concern that an article may not reach up to an end portion of each of the regions A1 and A2 when changing of the conveying direction is repeated around the boundary. On the other hand, when the region A3 in which the conveying direction is not changed is set, articles are continuously conveyed in one direction in the region A3. For this reason, articles may be favorably dispersed on the dispersion table 22.

Hereinbefore, the invention has been described using the above embodiment. However, the invention is not restricted to the above-described embodiment.

For example, in the above-described embodiment, a mode in which the control unit 106 sets the regions A1 to A3 on the dispersion table 22, and the vibrating mechanism 30 is controlled according to a control operation set for each of the regions A1 to A3 has been described as an example. Control of the vibrating mechanism 30 may have a predetermined pattern. In more detail, for example, when an article is conveyed in the first direction D1, a pattern including conveying in the second direction D2 in addition to conveying in the first direction D1 may be set.

In the above-described embodiment, the control unit 106 changes the conveying direction of the article on the dispersion table 22 based on a deviation in a loading state of the article calculated by the calculation unit 104. However, the control unit 106 may be configured to change the conveying direction of the article on the dispersion table 22 not based on the deviation in the loading state of the article calculated by the calculation unit 104 as in the above description.

In this case, the control unit 106 drives the dispersion table 22 in a fixed vibration pattern that temporally changes a plurality of parameters related to the conveying direction on the dispersion table 22. In this way, the control unit 106 changes the conveying direction of the article on the dispersion table 22.

In this instance, the control unit 106 first vibrates the dispersion table 22 N times in the first direction D1, and then vibrates the dispersion table 22 M times in the second direction D2 as the fixed vibration pattern. In this case, N and M may be different integers or the same integer. In other words, the control unit 106 performs a control operation such that articles on the dispersion table 22 are alternately conveyed in the first direction D1 and the second direction D2.

Hereinafter, an operation of changing a conveying direction of an article on the dispersion table 22 by the control unit 106 based on a deviation in a loading state of the article calculated by the calculation unit 104 will be referred to as a first operation mode. Meanwhile, an operation of changing a conveying direction of an article on the dispersion table 22 by the control unit 106 in a fixed vibration pattern not based on a deviation in a loading state of the article calculated by the calculation unit 104 will be referred to as a second operation mode.

Herein, the control unit 106 may perform a control operation to switch from the first operation mode to the second operation mode when a deviation is present in supply of the dispersion table 22 during an operation in the first operation mode.

In addition, the control unit 106 may perform a control operation to start an operation in the second operation mode, and then perform the operation in the first operation mode. In other words, the control unit 106 may selectively switch between the first operation mode and the second operation mode based on a deviation in a loading state or a supply state from the dispersion table 22.

Further, the control unit 106 may be configured to perform a control operation such that an operation is performed only in the second operation mode. In this case, the calculation unit 104 that calculates a deviation in a loading state of an article on the dispersion table 22 and a member necessary to calculate the deviation are not included. In this configuration, it is possible to achieve an object of uniformly supplying articles to a plurality of positions from the dispersion table 22. Specifically, since the calculation unit 104 and the member related thereto are not included as described above, an object of the present embodiment may be achieved at a lower price.

In the above-described embodiment, a description has been given of a mode, in which the dispersion supply portion 2 is configured by combining the two dispersion and supply apparatus 20 (20a and 20b), and the two dispersion tables 22 having semi-circular shapes divided in the circumferential direction to form a conical shape as a whole is included, as an example. A vibration is separately applied to each of the two dispersion tables 22 by a corresponding vibrating mechanism 30, and an article is conveyed. However, the dispersion supply portion may include only one dispersion and supply apparatus. In this case, one dispersion table having a conical shape is included. This dispersion table is rotated by a driving unit such as a motor that rotates the dispersion table to convey an article. In this configuration, a multi-point cell-type weight sensor including at least three load cells attached to a lower surface of the dispersion table may be used as the load amount detector. The control unit controls a rotation direction and a speed of the motor such that a conveying direction of an article on the dispersion table is changed based on a deviation in a loading state of the article calculated by the calculation unit.

In addition, the one dispersion table having the conical shape may have a mode in which an article is conveyed by a vibration. In this case, a vibrating mechanism may have the same configuration as or a different configuration from that of the above-described vibrating mechanism 30.

In addition, the dispersion table may have an external shape corresponding to a substantially eccentric cone shape. This dispersion table has a steeply inclined surface and a gently inclined surface, and conveys an article thrown onto the gently inclined surface by sliding the article down the gently inclined surface. In other words, in the dispersion and supply apparatus including this dispersion table, the dispersion table is rotated and moved such that the gently inclined surface faces a position to which the article is supplied. In a dispersion and supply apparatus having such a dispersion table, it is possible to acquire a load amount of an article on the dispersion table, calculate a deviation in a loading state based on the acquired load amount, and control a driving unit (for example, a motor, etc.) such that a conveying direction of the article on the dispersion table is changed based on the deviation.

In the above-described embodiment, the load cell 66 and 67 disposed below the dispersion table 22 has been described as an example of the acquisition unit for acquiring the load amount of the article on the dispersion table 22. However, means for acquiring the load amount is not restricted thereto. The acquisition unit may be an image sensor that captures an image of the article on the dispersion table 22 from above, or a distance measurement sensor that measures a distance from the article from above. Further, the load amount of the article on the dispersion table 22 may be estimated based on weighed values of the weight sensors 12 of the plurality of weighing hoppers 10.

In the above-described embodiment, a case in which a dispersion table having a semi-circular shape in a planar view is used has been described. However, in the invention, a planar shape of the dispersion table is particularly limited when the shape is continuous in the circumferential direction around the perpendicular direction. For example, the shape may correspond to a shape obtained by dividing a circle into three or more pieces in the circumferential direction, or a polygonal shape.

Further, in the above-described embodiment, an example in which each elastic portion group includes two elastic portions has been described. However, the elastic portion group may include three or more elastic portions having different inclined directions with respect to the perpendicular direction and different natural frequencies.

Further, in the above-described embodiment, a description has been given of the dispersion and supply apparatus including the two vibration sources of the first vibration source 32 and the second vibration source 33. However, only one vibration source may be provided, or three or more vibration sources may be provided. Further, a configuration of the vibration source is not limited to the vibration source including the electromagnetic coil and the movable iron core. For example, a vibration source including a piezoelectric element may be used.

In the above embodiment, a mode in which the conveyance apparatus 6 is a vibrator that moves an article on the trough 5 by applying a vibration to the trough 5 has been described as an example. However, a mechanism for conveying an article on the trough 5 is not limited to a vibration application type. For example, a rotational driving-type conveyance apparatus having a coil unit (screw) which may be driven to rotate on the trough 5 may be provided instead of the vibration application-type conveyance apparatus 6.

REFERENCE SIGNS LIST

1 . . . combination weighing apparatus, 10 . . . weighing hopper, 12 . . . weight sensor (weighing unit), 20 (20a, 20b) . . . dispersion and supply apparatus, 22 . . . dispersion table, 30 . . . vibrating mechanism (driving unit), 102 . . . operation unit, 104 . . . calculation unit, 106 . . . control unit, A1, A2, A3 . . . region, P . . . deviation center position.

The invention claimed is:

1. A dispersion and supply apparatus comprising:
   a dispersion table that receives an article supplied from above and conveys the article to a plurality of positions of an outer circumferential portion; and
   a driving unit that drives the dispersion table,
   wherein the dispersion and supply apparatus further comprises:
   an acquisition unit that acquires a load amount of the article on the dispersion table;
   a calculation unit that calculates a deviation in a loading state of the article based on the load amount acquired by the acquisition unit; and
   a control unit that controls the driving unit such that a conveying direction of the article on the dispersion table is changed based on the deviation in the loading state of the article calculated by the calculation unit.

2. The dispersion and supply apparatus according to claim 1, wherein the control unit sets a plurality of regions on the dispersion table, and controls the driving unit based on the regions and a deviation center position of the loading state of the article.

3. The dispersion and supply apparatus according to claim 2, wherein at least one of the plurality of regions is a region in which the conveying direction is not changed by the driving unit.

4. A combination weighing apparatus comprising:
   the dispersion and supply apparatus according to claim 1;
   a plurality of weighing hoppers disposed by being arranged in a circumferential direction around the dispersion table to hold articles supplied from the dispersion table;
   a weighing unit that measures weights of the articles held by the plurality of respective weighing hoppers; and
   an operation unit that selects a combination of the articles such that a value obtained by combining weighed values of the articles in the respective weighing hoppers falls within an allowable range around a target value.

5. A dispersion and supply apparatus comprising:
   a dispersion table that receives an article supplied from above and conveys the article to a plurality of positions of an outer circumferential portion; and
   a driving unit that drives the dispersion table,
   wherein the dispersion and supply apparatus further comprises:
   an acquisition unit that acquires a load amount of the article on the dispersion table;
   a calculation unit that calculates a deviation in a loading state of the article based on the load amount acquired by the acquisition unit; and
   a control unit that controls the driving unit, and
   the control unit selectively switches between a first operation mode in which a conveying direction of the article on the dispersion table is changed based on the deviation in the loading state of the article calculated by the calculation unit and a second operation mode in which the conveying direction of the article on the dispersion table is changed by a fixed vibration pattern based on a deviation in a loading state of the article on the dispersion table or a supply state of the article from the dispersion table.

* * * * *